Patented May 12, 1925.

1,537,858

UNITED STATES PATENT OFFICE.

THOMAS W. MILLER, OF ASHLAND, OHIO.

METHOD OF VULCANIZING RUBBER AND THE LIKE.

No Drawing.  Application filed November 25, 1922.  Serial No. 603,347.

*To all whom it may concern:*

Be it known that I, THOMAS W. MILLER, a citizen of the United States, residing at Ashland, county of Ashland, State of Ohio, have invented certain new and useful Improvements in Methods of Vulcanizing Rubber and the like, of which the following is a specification.

My invention relates to the vulcanization of rubber and the like, and has for its object to provide an improved method of treating such substances as to effect a practically perfect vulcanization in a comparatively short time and at low temperature.

More specifically, my invention, in its broad aspect, contemplates the use of sulphur and a suitable accelerator, applied to a compound of rubber or the like and a metallic oxide, such as lead or zinc, in conjunction with a gas, preferably air; though the same may be of any other inert gas.

My preferred method of vulcanization consists in first incorporating with the rubber and metallic oxide and sulphur in suitable proportions, usually from 1½ per cent to 4 per cent by weight of the rubber; then placing the same in a tight compartment or oven capable of being heated to a proper vulcanizing temperature, said compartment or oven being equipped with a circulating system for gas, preferably air, provision being made for evaporating and mixing with the circulating gas small quantities of a suitable accelerator. It will be found that the action of the gases from the accelerator in the circulated gas on the compound will produce a practically perfect vulcanization in from ten minutes to one hour, the time depending upon the amount of accelerator and sulphur used, the temperature of the rubber, and the thickness of the rubber mixture being vulcanized.

Under the old method of dry heat curing, vulcanization takes place at slightly above the melting point of sulphur (from 240° to 260° F.). By my new process perfect vulcanization can be obtained at much lower temperature than that necessary to melt or vaporize sulphur. In fact good results have been obtained as low as 210° F., and it is probable that even lower temperatures would produce satisfactory results. It will be understood, of course, that higher temperatures increase the rapidity of vulcanization.

This method may be varied by incorporating the accelerator with the rubber mixture or compound and mixing the circulating sulphur fumes with the gas which is circulated through the compartment or oven, though it has been found that the results obtained by this latter method are not as satisfactory as where the accelerator is mixed with a gas.

I claim:—

The method of vulcanizing rubber and the like, which consists in subjecting a rubber compound, such as rubber, a metallic oxide and sulphur, in a closed chamber while under a vulcanizing heat, to the action of a current of air containing an organic accelerator.

In testimony whereof I hereunto affix my signature.

THOMAS W. MILLER.